United States Patent
Park

(10) Patent No.: US 7,129,993 B2
(45) Date of Patent: Oct. 31, 2006

(54) METHOD AND APPARATUS FOR PROCESSING ON-SCREEN DISPLAY DATA DISPLAYED ON SCREEN

(75) Inventor: Hyun-sang Park, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 672 days.

(21) Appl. No.: 10/409,419

(22) Filed: Apr. 8, 2003

(65) Prior Publication Data

US 2004/0001163 A1    Jan. 1, 2004

(30) Foreign Application Priority Data

Jun. 28, 2002    (KR) .............................. 2002-37055

(51) Int. Cl.
  *H04N 5/50*    (2006.01)
  *G06F 17/00*   (2006.01)
  *G06C 5/00*    (2006.01)

(52) U.S. Cl. .................. 348/569; 715/794; 345/631

(58) Field of Classification Search ................ 348/569, 348/564, 584; 345/629, 632–634, 639, 640, 345/631; 715/768, 781, 788, 790, 794, 797; 709/202–204, 234, 236
See application file for complete search history.

(56) References Cited

U.S. PATENT DOCUMENTS

| | | | | |
|---|---|---|---|---|
| 6,003,067 | A  * | 12/1999 | Suzuki et al. ................ | 709/204 |
| 6,310,657 | B1 * | 10/2001 | Chauvel et al. .............. | 348/569 |
| 6,452,641 | B1 * | 9/2002  | Chauvel et al. .............. | 348/569 |
| 6,518,985 | B1 * | 2/2003  | Ozcelik et al. .............. | 715/794 |

FOREIGN PATENT DOCUMENTS

JP    10177374    6/1998

\* cited by examiner

*Primary Examiner*—Victor R. Kostak
(74) *Attorney, Agent, or Firm*—F. Chau & Associates, LLC

(57) ABSTRACT

An on-screen display (OSD) processor and a method for processing OSD data, by which only non-overlapped OSD data corresponding to each of a plurality of OSD windows is actually displayed on a screen can be processed, are provided. The method comprises storing coordinates of the plurality of OSD windows to be displayed on the screen in a memory according to their priorities; determining overlapped portions of the plurality of OSD windows which are overlapped by overlapping portions of the plurality of OSD windows, based on the coordinates and the priorities of the OSD windows; and processing all OSD data of the plurality of OSD windows except the determined overlapped portions, among the OSD data stored in the memory.

14 Claims, 5 Drawing Sheets

METHOD AND APPARATUS FOR PROCESSING ON-SCREEN DISPLAY DATA DISPLAYED ON SCREEN

BACKGROUND OF THE INVENTION

This application claims priority to Korean Patent Application No. 2002-37055, filed on Jun. 28, 2002, in the Korean Intellectual Property Office.

1. Field of the Invention

The present invention relates generally to an on-screen display (OSD) processor and a method for processing OSD data, and more particularly, to an OSD processor for effectively processing OSD data and a method for processing OSD data when a plurality of OSD windows are displayed on one screen.

2. Description of the Related Art

On-screen display (OSD) processors blend OSD-data representing an OSD window with background video data at an appropriate rate and generate data to be output on a screen.

In general, OSD processors used in consumer electronics appliances display a menu comprised only of text or figures having a fixed shape on a screen. However, as user's demands on user interfaces increase, OSD processors should display graphics or pictures having complicated shapes on the screen.

However, the amount of OSD data corresponding to graphics having complicated shapes is still greater than the amount of OSD data corresponding to text or figures having a fixed shape, e.g., about several tens of times greater. Also, when a plurality of OSD windows are displayed on one screen, the computational load on OSD processors further increases.

FIG. 1 is a block diagram of a conventional OSD processor for displaying two OSD windows. Referring to FIG. 1, an OSD processor 100 includes video first-in and first-out (FIFO) memory device 110, first OSD FIFO memory device 120, second OSD FIFO memory device 130, a blending circuit 140, and LCD FIFO memory device 150. Hereinafter, all instances of FIFO memory device will simply be referred to as FIFO.

FIG. 2 illustrates two OSD windows and a video region displayed on one screen 20. Referring to FIGS. 1 and 2, the video FIFO 110 stores data of a video region read from a main memory (not shown).

The first OSD FIFO 120 stores OSD data of a first OSD window 21 read from the main memory, and the second OSD FIFO 130 stores OSD data of a second OSD window 23 read from the main memory.

The blending circuit 140 receives signals output from the video FIFO 110, the first OSD FIFO 120, and the second OSD FIFO 130, respectively, blends the signals at an appropriate rate with one another, generates data to be displayed on the screen 20, and outputs the data to the LCD FIFO 150.

The LCD FIFO 150 stores an output signal of the blending circuit 140 temporarily and outputs the stored data to the display 20.

If the number of OSD windows processed by the OSD processor is increased, the number of OSD FIFOs in which OSD data are stored, is also increased. As a result, the computational load on a memory controller (not shown) in which the increased OSD FIFO is stored, increases linearly.

When the first OSD window 21 and the second OSD window 23 are simultaneously displayed on the screen 20, only OSD data of the OSD window having a highest priority are displayed on an overlapped portion 25 of the first and second OSD windows 21 and 23.

Here, the priority of the second OSD window 23 is higher than the priority of the first OSD window 21, and the priority of the first OSD window 21 is higher than the priority of the video region. That is, the number in parentheses is an index representing the priority of the OSD window. Thus, only OSD data of the second OSD window 23 are displayed on the overlapped portion 25 of the first and second OSD windows 21 and 23.

Referring to FIG. 2, OSD data at an interval A are stored in the first OSD FIFO 120, and OSD data at an interval B are stored in the second OSD FIFO 130. Thus, the OSD processor 100 reads the OSD data of the overlapped portion 25 of the first and second OSD windows 21 and 23 from the main memory and stores the read OSD data in the first and second OSD FIFOs 120 and 130, respectively.

Thus, on the overlapped portion 25 of the first and second OSD windows 21 and 23, the OSD processor 100 will read and store the OSD data of the first ODS window 21 that is not displayed on the screen 20, and thus the burden on the OSD processor 100 increases.

Also, if the number of OSD windows displayed on one screen is increased, the number of OSD FIFOs in which the OSD data of a corresponding OSD window are stored, is increased, and the computational load on the OSD processor for processing the OSD data of the corresponding OSD window increases linearly.

SUMMARY OF THE INVENTION

The present invention provides an on-screen display (OSD) processor and a method for processing OSD data, by which only OSD data corresponding to each of a plurality of OSD windows actually-displayed on a screen among OSD data stored in a memory can be processed.

According to an aspect of the present invention, there is provided a method for processing on-screen display (OSD) data in an OSD processor displaying a plurality of OSD windows on a screen. The method comprises storing coordinates of the plurality of OSD windows to be displayed on the screen in a memory according to their priorities, determining overlapped portions of the plurality of OSD windows which are overlapped by overlapping portions of the plurality of OSD windows, based on the coordinates and the priorities of the OSD windows, and processing all OSD data of the plurality of OSD windows except the determined overlapped portions, among OSD data stored in the memory.

The processing of all OSD data comprises storing only OSD data to be displayed on the screen, among the OSD data stored in the memory in a first first-in first-out memory device (FIFO), receiving video data stored in the memory and to be used as a background and storing the received video data in a second FIFO, and blending the OSD data stored in the first FIFO with the video data stored in the second FIFO and outputting data to be displayed on the screen.

According to another aspect of the present invention, there is provided an OSD processor. The OSD processor includes a first first-in first-out (FIFO) in which coordinates of a plurality of OSD windows to be displayed according to their priorities are stored, an on-screen display (OSD) FIFO in which OSD data to be actually displayed on a screen according to their priorities are stored, a video FIFO in which video data to be used as a background are stored, a memory controller for reading the OSD data corresponding to non-overlapped portion coordinates of the OSD windows stored in the first FIFO from a predetermined memory, storing the read OSD data in the OSD FIFO, reading the video data from the memory and storing the read video data in the video FIFO, and a blending circuit to receive the OSD data stored in the OSD FIFO and the video data stored in the video FIFO, blending the OSD data with the video data, and outputting the result of blending.

The first FIFO includes a vertical FIFO in which y-coordinates of the plurality of OSD windows, in a projection order in a horizontal direction, are stored, and a horizontal FIFO in which x-coordinates of the plurality of OSD windows, in a projection order in a vertical direction, are stored.

According to another aspect of the present invention, there is provided an OSD processor. The OSD processor includes a main control unit (MCU) to generate coordinates of a plurality of OSD windows to be displayed on a screen, an on-screen display (OSD) register in which the coordinates of the plurality of OSD windows generated by the MCU are stored, a priority calculation circuit to receive coordinates of each OSD window stored in the OSD register and calculate a priority of each OSD window to be displayed on the screen, a vertical first first-in first-out (FIFO) in which y-coordinates of the plurality of OSD windows, in a projection order in a horizontal direction, are stored in response to an output signal of the priority calculation circuit, a horizontal FIFO in which x-coordinates of the plurality of OSD windows, in a projection order in a vertical direction, are stored in response to the output signal of the priority calculation circuit, OSD FIFO in which OSD data to be actually displayed on a screen according to their priorities are stored, video FIFO in which video data to be used as a background is are stored, a memory controller for reading the OSD data corresponding to non-overlapped portion coordinates of the OSD windows stored in the first FIFO from a predetermined memory, storing the read OSD data in the OSD FIFO, reading the video data from the memory and storing the read video data in the video FIFO, and a blending circuit to receive the OSD data stored in the OSD FIFO and the video data stored in the video FIFO, blend the OSD data with the video data, and output the result of blending.

The OSD processor further includes a second FIFO to receive an output signal of the blending circuit and output the received output signal to a predetermined display. The size of the first FIFO is at least twice the number of the plurality of OSD windows. The sizes of the OSD FIFO and the video FIFO are proportional to the amount of maximum data which the memory controller can read from the memory in a burst mode.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF PREFERED EMBODIMENTS

Figure 1:
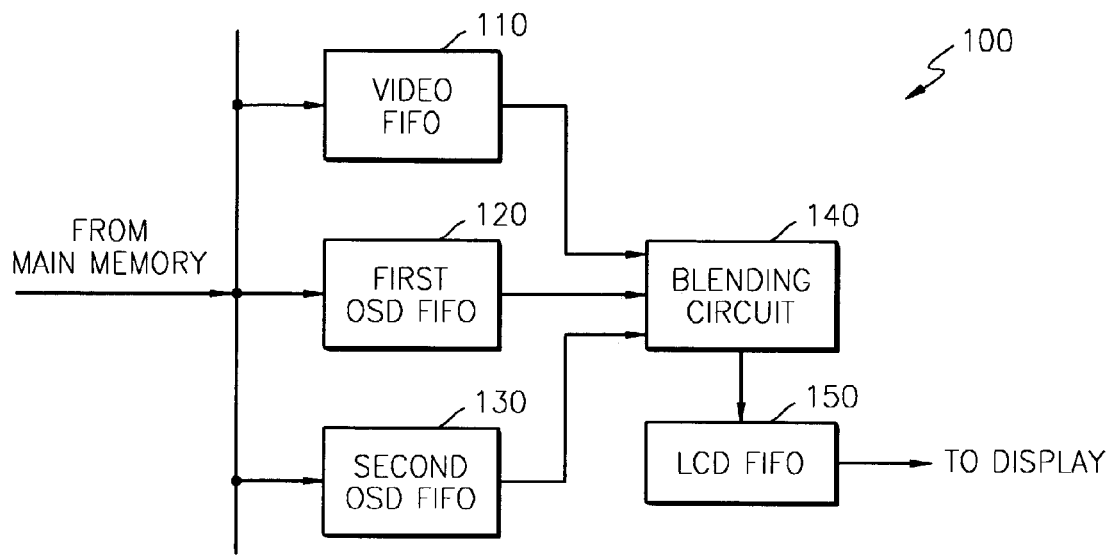
FIG. 1 is a block diagram of a conventional on-screen display (OSD) processor for displaying two OSD windows.
Figure 2:
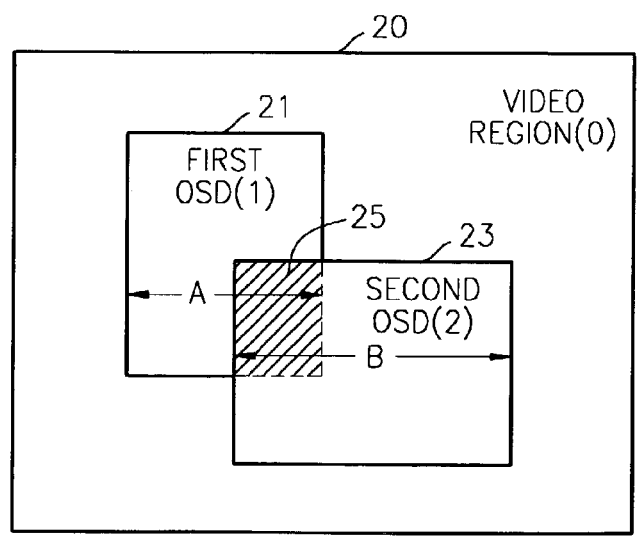
FIG. 2 illustrates two OSD windows and a video region displayed on one screen.

Hereinafter, the present invention will be described in detail by describing preferred embodiments of the invention with reference to the accompanying drawings. Like reference numerals refer to like elements throughout the drawings.

Figure 3:
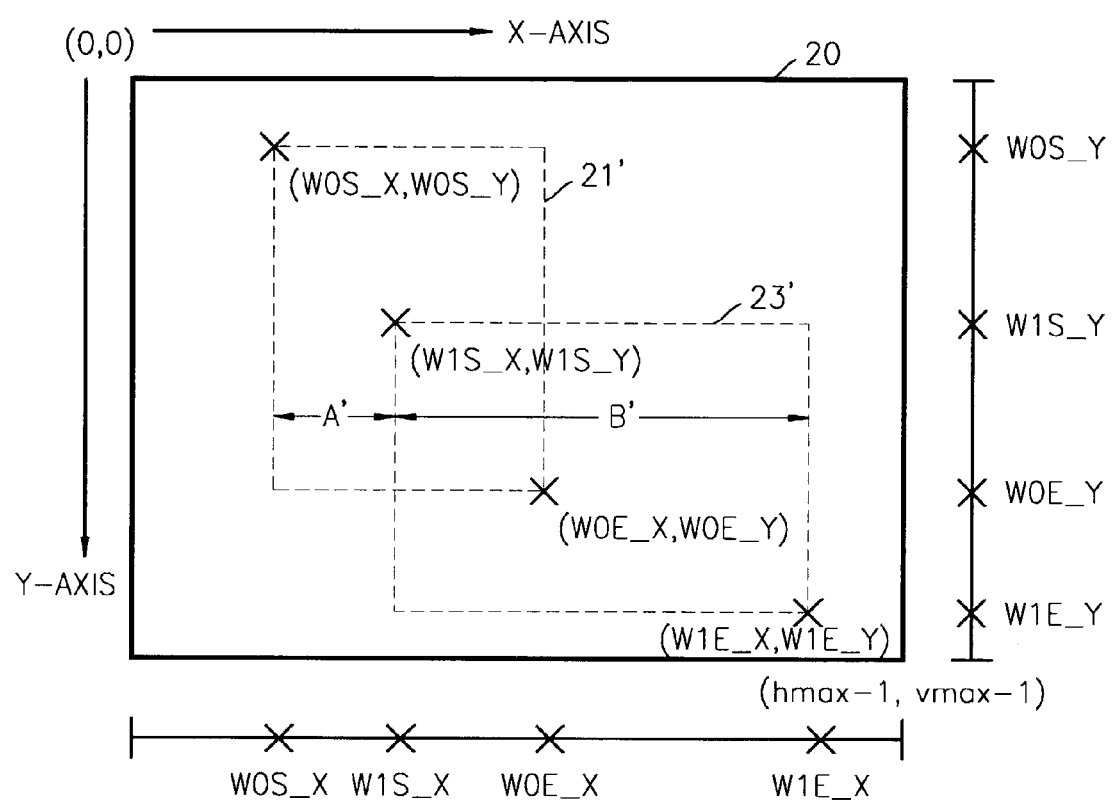
FIG. 3 illustrates location coordinates of an OSD window projected in vertical and horizontal directions, according to an embodiment of the present invention.

FIG. 3 illustrates vertical and horizontal location coordinates of an OSD window according to an embodiment of the present invention.

Figure 4:
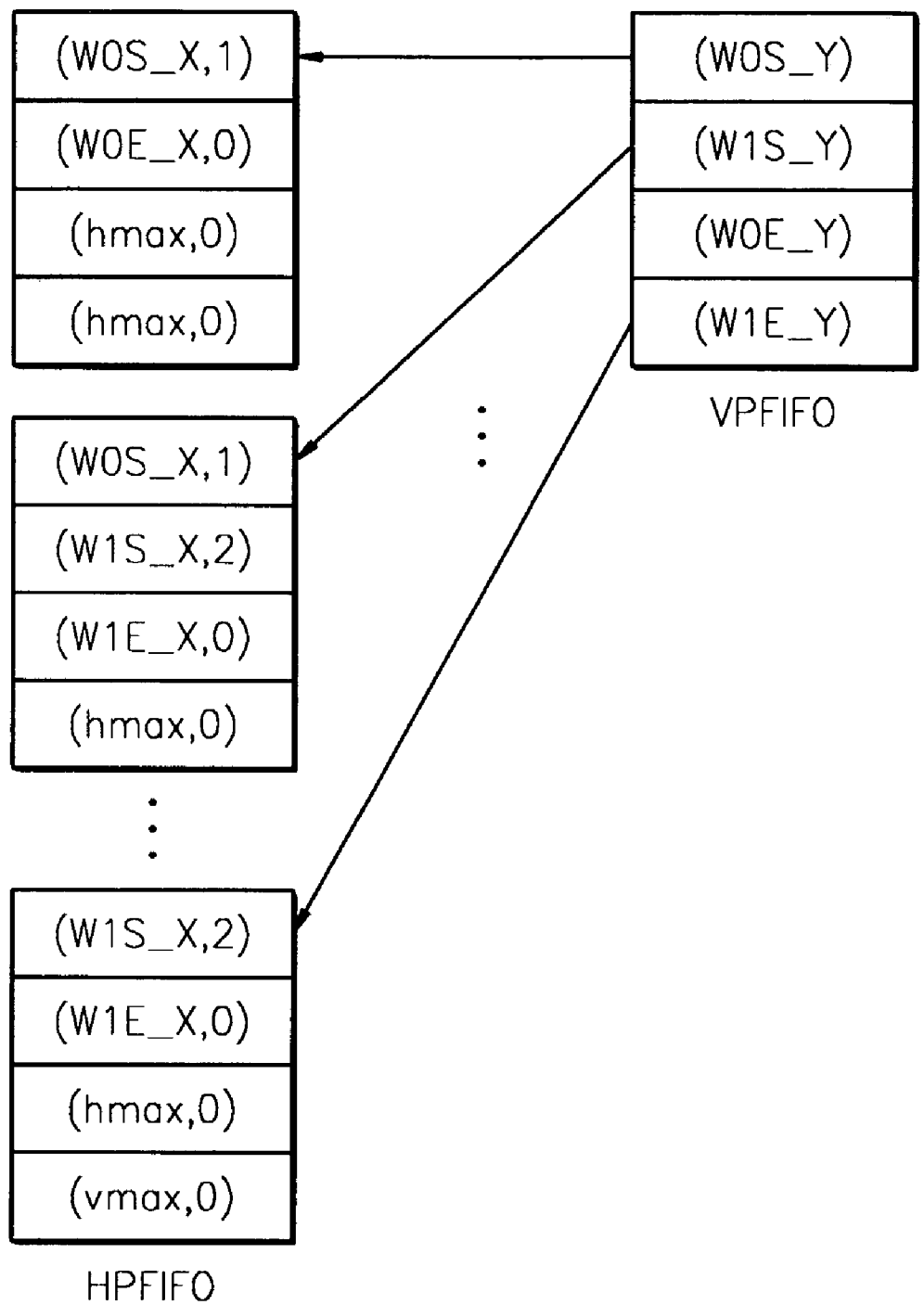
FIG. 4 illustrates the location coordinates of FIG. 3 stored in VPFIFO and HPFIFO.

FIG. 4 illustrates the location coordinates of FIG. 3 stored in a vertical first-in first-out memory device VPFIFO and a horizontal first-in first-out memory device HPFIFO which will be described below in conjunction with FIGS. 4 and 5. Although a plurality of OSD windows may be displayed on one screen 20, in FIGS. 3 and 4, for convenience, only two OSD windows 21' and 23' are displayed on the screen 20.

Referring to FIG. 3, coordinates of a starting point of the first OSD window 21' are (W0S_X, W0S_Y), and coordinates of an ending point of the first OSD window 21' are (W0E_X, W0E_Y). Also, coordinates of a starting point of the second OSD window 23' are (W1S_X, W1S_Y), and coordinates of an ending point of the second OSD window 23' are (W1E_X, W1E_Y). Also, the size of the screen 20 is given by hmax and vmax in horizontal and vertical directions, respectively.

The result of projecting the coordinates of the starting point and the ending point of the first OSD window 21' and the coordinates of the starting point and the ending point of the second OSD window 23', respectively, in a horizontal direction is shown in the drawing on the right side of FIG. 3.

Each of the coordinates (W0S_Y, W1S_Y, W0E_Y, W1E_Y) projected in the horizontal direction, is stacked and stored downwardly in a first first-in first-out memory device (FIFO) of FIG. 4. This FIFO is referred to as VPFIFO. The VPFIFO stores the y-coordinates.

Since the coordinates of the starting point and ending point with respect to each of the first and second OSD windows 21' and 23' are generated, the OSD processor for displaying N OSD windows (where N is a natural number) will include a VPFIFO in which a maximum of 2N coordinates are stored.

The result of projecting the coordinates of the starting point and the ending point of the first OSD window 21' and the coordinates of the starting point and the ending point of the second OSD window 23', respectively, in a vertical direction is shown in the drawing on the lower side of FIG. 3.

Each of the coordinates (W0S_X, W1S_X, W0E_X, W1E_X) projected in the vertical direction, is stacked and stored downwardly in a second first-in and first-out (FIFO) of FIG. 4. This FIFO is referred to as HPFIFO.

Since the coordinates of the starting point and ending point with respect to each of the first and second OSD windows 21' and 23' are generated, the OSD processor for displaying N OSD windows (where N is a natural number) will include a HPFIFO in which a maximum of 2N coordinates are stored.

The coordinates stored in the HPFIFO corresponding to each of the coordinates stored in the VPFIFO are shown in FIG. 4. For example, the coordinate W0S_Y stored in the VPFIFO corresponds to the coordinates (W0S_X, 1), (W0E_X, 0), (hmax, 0), and (hmax, 0) stored in the HPFIFO. In the coordinate (W0S_X, 1), (W0S_X) represents a starting point of the first OSD window 21', and "1" is an index representing the priority of the first OSD window 21'. In the coordinate (W0E_X, 0), (W0E_X) represents an ending point of the first OSD window 21', and "0" is an index representing the priority of the video region. (hmax, 0) represents a value set by default.

The coordinates stored in the HPFIFO corresponding to the coordinates W1S_Y stored in the VPFIFO are (W0S_X, 1), (W1S_X, 2), (W1E_X, 0), and (hmax, 0). In the coordinate (W0S_X, 1), (W0S_X) represents a starting point of the first OSD window 21', and "1" is an index representing the priority of the first OSD window 21'. In the coordinate (W1S_X, 2), (W1S_X) represents an ending point of the first OSD window 21', and simultaneously represents a starting point of the second OSD window 23', and "2" is an index representing the priority of the second OSD window 23'.

Figure 5:
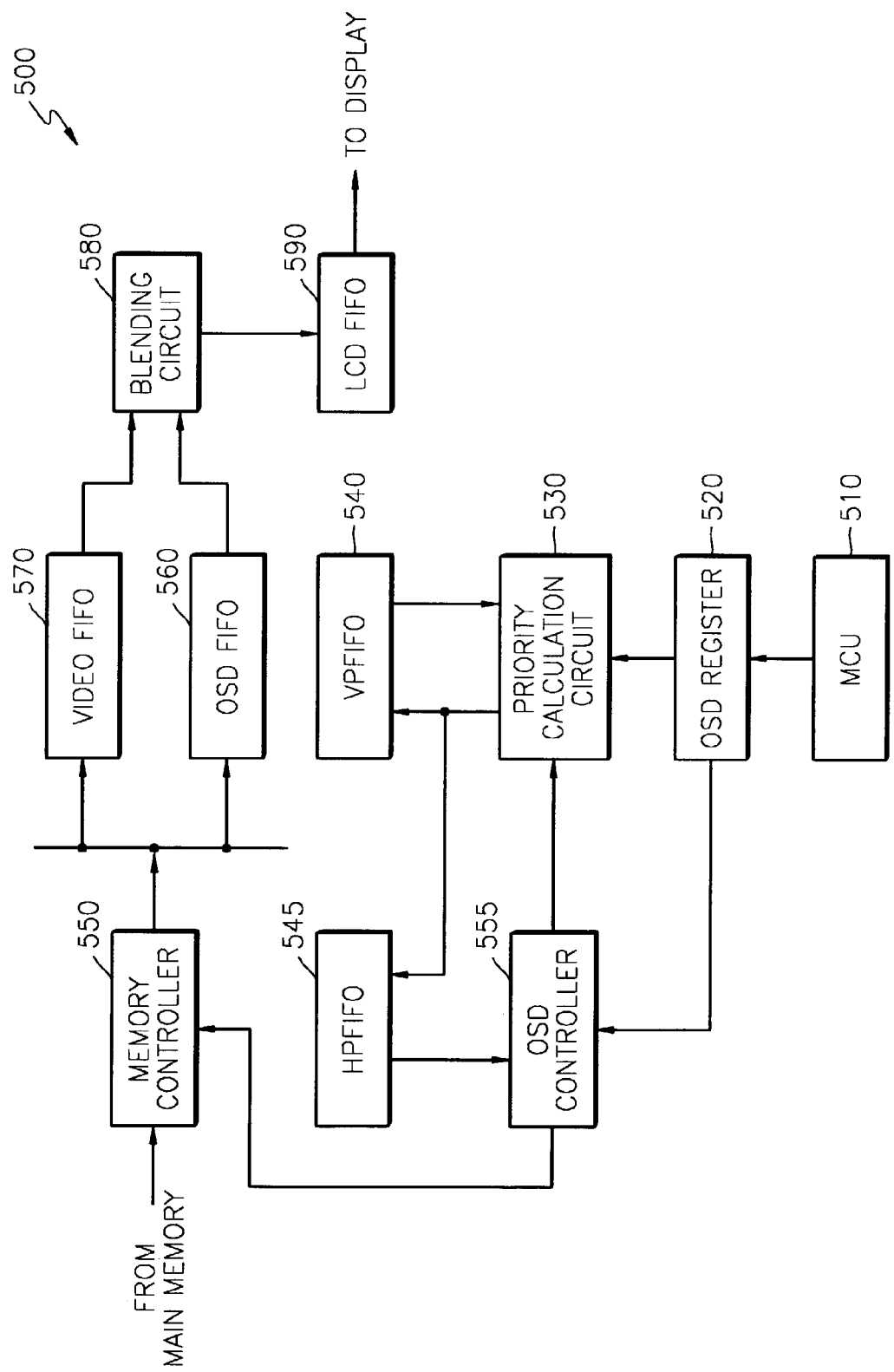
FIG. 5 is a block diagram illustrating an embodiment of an OSD processor according to the present invention.

FIG. 5 is a block diagram illustrating an embodiment of an OSD processor according to the present invention. Referring to FIG. 5, an OSD processor 500 includes a main control unit (MCU) 510, an OSD register 520, a priority calculation circuit 530, VPFIFO 540, HPFIFO 545, a memory controller 550, an OSD controller 555, OSD FIFO 560, video FIFO 570, a blending circuit 580, and LCD FIFO 590.

The OSD processor according to an embodiment of the present invention is an example of a graphic processor, and it is obvious that the OSD processor displays a plurality of windows on a screen and displays graphics on each window.

When a user wants to simultaneously display a plurality of OSD windows on a screen, the MCU 510 generates the coordinates of a starting point and an ending point of each OSD window to be displayed on the screen and stores the coordinates in the OSD register 520.

The priority calculation circuit 530 receives the coordinates of each OSD window stored in the OSD register 520, calculates the priority of each OSD window to be displayed on the screen, and stores the coordinates projected in a horizontal direction in the VPFIFO 540 in a predetermined order, respectively, as shown in FIGS. 3 and 4.

Also, the priority calculation circuit 530 stores the x-axis coordinates of each OSD window projected in a vertical direction and an index in the HPFIFO 545, as shown in FIGS. 3 and 4.

The minimum sizes of the VPFIFO 540 and the HPFIFO 545 in which the coordinates of each OSD window are stored, will be more than twice the number of OSD windows to be processed by the OSD processor 500. The OSD controller 555 controls the overall operation of the OSD processor 500.

The memory controller 550 reads only non-overlapped OSD data to be actually displayed on the screen (e.g., OSD data corresponding to the coordinates stored in the VPFIFO 540 and the HPFIFO 545) among ODS data stored in a main memory (not shown) and stores the read OSD data in the OSD FIFO 560. That is, OSD data corresponding to an interval A' and OSD data corresponding to an interval B' are stored in the OSD FIFO 560, as shown in FIG. 3. Thus, the memory controller 550 does not read the OSD data of the first OSD window 21' on an overlapped portion of the first OSD window 21' and the second OSD window 23', and thus the efficiency of the memory controller 550 is maximized. Also, the memory controller 550 reads video data to be used as a background (e.g., video region) among video data stored in the main memory (not shown) and stores the read video data in the video FIFO 570.

The sizes of the OSD FIFO 560 and the video FIFO 570 will be proportional to the amount of maximum data which the main controller 550 can read from the main memory in a burst mode.

The blending circuit 580 receives the OSD data of the OSD FIFO 560 and the video data of the video FIFO 570, blends the received OSD data and the received video data at an appropriate rate with each other to generate data to be displayed on the screen 20, and outputs the blended data to the LCD FIFO 590.

The LCD FIFO 590 temporarily stores an output signal of the blending circuit 580 and outputs the stored data to a display. Preferably, the size of the LCD FIFO. 590 is determined by considering the data processing speed of the main memory and speed with which the display displays data. The display includes a LCD controller or a NTSC/PAL encoder (not shown).

Figure 6:
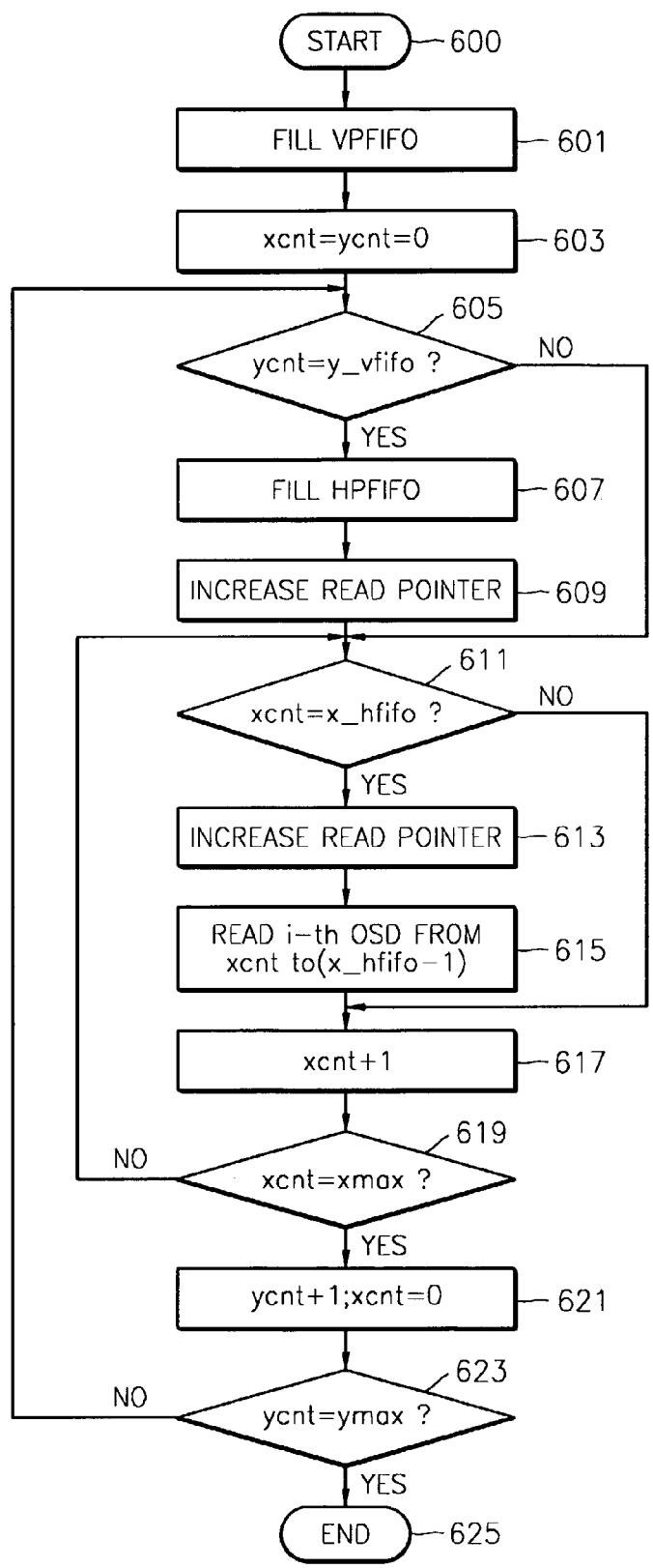
FIG. 6 is a flow chart illustrating an embodiment of the operation of the OSD processor according to the present invention.

FIG. 6 is a flow chart illustrating an embodiment of the operation of the OSD processor according to the present invention. Referring to FIG. 6, a coordinate (xcnt, ycnt) represents horizontal and vertical coordinates of a pixel to be currently processed by the OSD processor.

Also, y_vfifo represents a y-axis coordinate value stored in a position indicated by a read pointer of the VPFIFO 540, x_hfifo represents an x-axis coordinate value stored in a position indicated by a read pointer of the HPFIFO 545, and i represents an index of the OSD window started from the x-axis coordinate value. Here, if i is 0, it means that there is no OSD window.

Hereinafter, the operation of the OSD controller 555 according to the present invention will be described in detail with reference to FIGS. 3 through 6. In step 600, if processing of one frame starts, the OSD controller 555 drives the priority calculation circuit 530, and in step 601, the priority calculation circuit 530 stores the y-axis coordinate value in the VPFIFO 540 in the same manner as shown in FIG. 3, and initializes the coordinate (xcnt, ycnt) to (0, 0) in step 603.

In step 605, the OSD controller 555 determines whether ycnt is equal to y_vfifo. The OSD controller 555 performs step 607 or 611 according to the result of determination. Since ycnt=y_vfifo means that the structure of the OSD window to be displayed in the horizontal direction is varied, in step 607, the OSD controller 555 drives the priority calculation circuit 530, and the priority calculation circuit 530 stores the x-axis coordinates of the OSD window projected in the vertical direction and the indexes of the OSD window in the HPFIFO 545, as shown in FIG. 4. In step 609, the OSD controller 555 increases the read pointer of the VPFIFO 540. In this case, the VPFIFO 540 outputs a coordinate corresponding to the increased read pointer.

In step 611, the OSD controller 555 determines whether xcnt is equal to x_hfifo. The OSD controller 555 performs step 613 or 617 according to the result of determination. Here, if xcnt=x_hfifo, a new OSD window starts.

Thus, the OSD controller 555 increases the read pointer of the HPFIFO 545 to update x_hfifo (step 613). In this case, x_hfifo represents the starting point of the next OSD window, and thus in step 615, the OSD controller 555 reads a number (x_hfifo-xcnt) of the OSD data of the pixel corresponding to the OSD window having a predetermined index i through the memory controller 550 from the main memory in the OSD FIFO 560.

If the OSD data starts to be stored in the OSD FIFO 560, the OSD controller 555 increases a value xcnt by one in step 617. Whenever xcnt is increased by one, the OSD data stored in the OSD FIFO 560 is output to the blending circuit 580 by one, and the blending circuit 580 receives the video data output from the video FIFO 570 and the OSD data output from the OSD FIFO 560, blends the video data and the OSD data at an appropriate rate with each other, and outputs the result of blending to the LCD FIFO 590.

In step 619, the OSD controller 555 determines whether xcnt is equal to xmax, and the OSD controller 555 performs step 621 or 611. When xcnt=xmax, processing of one horizontal line is completed, a current vertical coordinate ycnt is increased by one and the next horizontal line is processed in step 621.

The OSD controller 555 determines whether ycnt is equal to ymax in step 623, and the OSD controller 555 performs step 605 or 625 according to the result of the determination. In step 625, if ycnt=ymax, data processing of one frame is completed.

For example, the case where the OSD processor 500 processes a horizontal line corresponding to W0S_Y will be described below with reference to FIGS. 3 through 6. The OSD controller 555 stores x-axis coordinates (W0S_X, W1S_X) of the first OSD window 21' projected on an axis where y is equal to W0S_Y, and an index 1 of the first OSD window 21' in the HPFIFO 545, as shown in FIG. 4. If the OSD controller 555 increases the read pointer of the VPFIFO 540, the VPFIFO 540 outputs a coordinate W1S_Y.

If xcnt is increased from 0 and xcnt=W0S_X, the stating point of the first OSD window 21' is xcnt=W0S_X. The index of the first OSD window 21' is 1. If the OSD controller 555 increases the read pointer, the HPFIFO 545 outputs W0E_X, which denotes the x-coordinate of the stating point of the video region.

The memory controller 550 reads a number (W0E_X−xcnt(=W0S_X)) of OSD data corresponding to the pixel corresponding to the first OSD window 21' from the main memory and stores the read OSD data in the OSD FIFO 560.

If the number (W0E_X−xcnt(=W0S_X)) of OSD data starts to be stored in the OSD FIFO 560, the OSD controller 555 increases the value xcnt by one, and the OSD FIFO 560 outputs the OSD data to the blending circuit 580 by one. The blending circuit 580 blends the output signal of the video FIFO 570 with the output signal of the OSD FIFO 560 and outputs the result of blending to the LCD FIFO 590.

The OSD processor 500 repeatedly performs processing of the OSD data on the first OSD window 21' until a horizontal line corresponding to W1S_Y is processed. When ycnt=W1S_Y, the structure of the OSD window to be displayed in the horizontal direction is varied and the OSD controller 555 stores x-axis coordinates (W0S_X, W1S_X, W0E_X, W1E_X) of the OSD windows 21' and 23' projected on an axis y=W1S_Y and indexes of the OSD windows 21' and 23' corresponding to the x-axis coordinates in the HPFIFO 545, as shown in FIG. 4. If the OSD controller 555 increases the read pointer of the VPFIFO 540, the VPFIFO 540 outputs a coordinate W0E_Y.

If xcnt is increased from 0 and xcnt is equal to W0S_X, the OSD controller 555 increases the read pointer of the HPFIFO 545 by W1S_X, and the HPFIFO 545 outputs a coordinate W1S_X.

The memory controller 550 reads a number (W1S_X−W0S_X) of the OSD data of pixels corresponding to the first OSD window 21', e.g., from the x-axis coordinate W0S_X to the coordinate W1S_X, from the main memory and stores the read OSD data in the OSD FIFO 560.

If xcnt is increased from W0S_X and xcnt is equal to W1S_X, the OSD controller 555 increases the read pointer of the HPFIFO 545 by W1E_X, and the HPFIFO 545 outputs the coordinate W1E_X.

The memory controller 550 reads a number (W1E_X−W1S_X) of the OSD data of pixels corresponding to the second OSD window 23', e.g., from the x-axis coordinate W1S_X to the coordinate W1E_X, from the main memory and stores the read OSD data in the OSD FIFO 560.

If the number (W1E_X−W1S_X) of OSD data starts to be stored in the OSD FIFO 560, the OSD controller 555 increases the value xcnt by one, and the OSD FIFO 560 outputs the OSD data to the blending circuit 580 by one. The blending circuit 580 blends the output signal of the video FIFO 570 with the output signal of the OSD FIFO 560 and outputs the result of the blending to the LCD FIFO 590.

If xcnt is equal to W1E_X, W1E_X represents the x-coordinates of the starting point of the video region. The OSD processor 500 repeatedly performs the above-mentioned data processing until ycnt is equal to ymax. Thus, as described above, the OSD processor 500 according to an embodiment of the present invention reads only OSD data that are actually displayed on the screen, among OSD data stored in the main memory even when the plurality of OSD windows are simultaneously displayed on the screen.

As described above, in the OSD processor and the method for processing OSD data according to embodiments of the present invention, only actually-displayed OSD data among the OSD data stored in the memory are displayed, e.g., non-overlapping portions of the OSD windows, and thus the computational load on the OSD processor is reduced, and the efficiency of the OSD processor is maximized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for processing on-screen display (OSD) data in an OSD processor for displaying a plurality of OSD windows on a screen, the method comprising the steps of:
   storing coordinates of plurality of OSD windows to be displayed on the screen in a memory according to their priorities;
   determining overlapped portions of the plurality of OSD windows which are overlapped by overlapping portions of the plurality of OSD windows, based on the coordinates and the priorities of the OSD windows; and
   processing all OSD data of the plurality of OSD windows except the determined overlapped portions, among the OSD data stored in the memory;
   storing only OSD data to be displayed on the screen, among the OSD data stored in the memory in a first first-in first-out memory device (FIFO);
   receiving video data stored in the memory and storing the received video data in a second FIFO, the video data being used as a background; and
   blending the OSD data stored in the first FIFO with the video data stored in the second FIFO and outputting data to be displayed on the screen.

2. The method of claim 1, further comprising the step of determining a starting point and an ending point for each of the plurality of OSD windows.

3. The method of claim 1, wherein the first FIFO comprises:

a vertical FIFO for storing y-coordinates of the plurality of OSD windows, in a projection order in a horizontal direction; and a horizontal FIFO for storing x-coordinates of the plurality of OSD windows, in a projection order in a vertical direction.

4. The method of claim 3, wherein the x-coordinates include an index representing the priorities of the plurality of OSD windows.

5. The method of claim of claim 1, wherein a size of the first FIFO is at least twice the number of the plurality of OSD windows.

6. An on-screen display (OSD) processor comprising:

a first first-in first-out memory device (FIFO) for storing coordinates of a plurality of OSD windows to be displayed according to their priorities;

an on-screen display (OSD) FIFO for storing OSD data to be actually displayed on a screen according to their priorities;

a video FIFO for storing video data to be used as a background;

a memory controller for reading the OSD data corresponding to non-overlapped portion coordinates of the OSD windows stored in the first FIFO from a predetermined memory, storing the read OSD data in the OSD FIFO, reading the video data from the memory and storing the read video data in the video FIFO; and a blending circuit for receiving the OSD data stored in the OSD FIFO and the video data stored in the video FIFO, blending the OSD data with the video data, and outputting the result of blending.

7. The processor of claim 6, wherein the first FIFO comprises:

a vertical FIFO for storing y-coordinates of the plurality of OSD windows, in a projection order in a horizontal direction; and a horizontal FIFO for storing x-coordinates of the plurality of OSD windows, in a projection order in a vertical direction.

8. The processor of claim 6, further comprising a second FIFO for receiving an output signal of the blending circuit and outputting the received output signal to a predetermined display.

9. The processor of claim 6, wherein a size of the first FIFO is at least twice the number of the plurality of OSD windows.

10. The processor of claim 6, wherein the sizes of the OSD FIFO and the video FIFO are proportional to an amount of maximum data which the memory controller can read from the memory in a burst mode.

11. An on-screen display (OSD) processor comprising:

a main control unit (MCU) for generating coordinates of a plurality of OSD windows to be displayed on a screen;

an on-screen display (OSD) register for storing the coordinates of the plurality of OSD windows generated by the MCU;

a priority calculation circuit for receiving coordinates of each OSD window stored in the OSD register and calculating a priority of each OSD window to be displayed on the screen;

a vertical first first-in first-out memory device (FIFO) for storing y-coordinates of the plurality of OSD windows, in a projection order in a horizontal direction, in response to an output signal of the priority calculation circuit;

a horizontal FIFO for storing x-coordinates of the plurality of OSD windows, in a projection order in a vertical direction, in response to the output signal of the priority calculation circuit;

an OSD FIFO for storing OSD data to be actually displayed on a screen according to their priorities;

a video FIFO for storing video data to be used as a background;

a memory controller for reading the OSD data corresponding to non-overlapped portion coordinates of the OSD windows stored in the first FIFO from a predetermined memory, storing the read OSD data in the OSD FIFO, reading the video data from the memory and storing the read video data in the video FIFO; and a blending circuit for receiving the OSD data stored in the OSD FIFO and the video data stored in the video FIFO, blending the OSD data with the video data, and outputting the result of blending.

12. The processor of claim 11, further comprising a second FIFO for receiving an output signal of the blending circuit and outputting the received output signal to a predetermined display.

13. The processor of claim 11, wherein the size of the first FIFO is at least twice the number of the plurality of OSD windows.

14. The processor of claim 11, wherein the sizes of the OSD FIFO and the video FIFO are proportional to an amount of maximum data which the memory controller can read from the memory in a burst mode.

* * * * *